(12) United States Patent
Bharti

(10) Patent No.: US 12,202,481 B2
(45) Date of Patent: *Jan. 21, 2025

(54) VEHICULAR DRIVER ASSIST SYSTEM WITH AUTOMATIC SPEED SETTING PARAMETERS

(71) Applicant: Magna Electronics Inc., Auburn Hills, MI (US)

(72) Inventor: Brijendra Kumar Bharti, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 180 days.

This patent is subject to a terminal disclaimer.

(21) Appl. No.: 18/151,535

(22) Filed: Jan. 9, 2023

(65) Prior Publication Data

US 2023/0159030 A1    May 25, 2023

Related U.S. Application Data

(63) Continuation of application No. 17/247,338, filed on Dec. 8, 2020, now Pat. No. 11,548,505.

(60) Provisional application No. 62/945,246, filed on Dec. 9, 2019.

(51) Int. Cl.
| | |
|---|---|
| *B60W 30/14* | (2006.01) |
| *B60W 30/18* | (2012.01) |
| *B60W 40/08* | (2012.01) |

(52) U.S. Cl.
CPC .... *B60W 30/146* (2013.01); *B60W 30/18072* (2013.01); *B60W 40/08* (2013.01); *B60K 2310/244* (2013.01); *B60W 2420/403* (2013.01); *B60W 2520/10* (2013.01); *B60W 2540/12* (2013.01)

(58) Field of Classification Search
CPC ......... B60W 30/146; B60W 30/18072; B60W 40/08; B60W 242/403; B60W 2520/10; B60W 2540/12; B60K 2310/244; Y02T 10/60

See application file for complete search history.

(56) References Cited

U.S. PATENT DOCUMENTS

| | | | | |
|---|---|---|---|---|
| 5,550,677 | A | * | 8/1996 | Schofield ............... B60N 2/002 348/E7.086 |
| 5,670,935 | A | * | 9/1997 | Schofield ............... B60Q 9/008 348/E7.086 |
| 5,949,331 | A | | 9/1999 | Schofield et al. |

(Continued)

*Primary Examiner* — Mussa A Shaawat
(74) *Attorney, Agent, or Firm* — HONIGMAN LLP

(57) ABSTRACT

A vehicular driver assist system includes a forward-viewing camera disposed at and viewing through a windshield of a vehicle. The vehicular driver assist system sets an initial vehicle soft lock speed when speed of the vehicle reaches an initial threshold speed of travel. With the initial vehicle soft lock speed set and with the vehicle speed exceeding the initial vehicle soft lock speed, the system maintains the vehicle speed at the initial vehicle soft lock speed when the vehicle speed reduces to the initial vehicle soft lock speed by coasting. When speed of the vehicle increases by a multiple of a vehicle speed increment above the initial vehicle soft lock speed, the system sets an increased vehicle soft lock speed and maintains the vehicle speed at the increased vehicle soft lock speed when the vehicle speed reduces to the increased vehicle soft lock speed by coasting.

35 Claims, 2 Drawing Sheets

(56) References Cited

U.S. PATENT DOCUMENTS

| | | | | |
|---|---|---|---|---|
| 6,236,929 B1* | 5/2001 | Sen | | F16H 61/21 |
| | | | | 701/87 |
| 7,038,577 B2* | 5/2006 | Pawlicki | | B60W 30/143 |
| | | | | 340/436 |
| 7,526,103 B2* | 4/2009 | Schofield | | B60R 1/24 |
| | | | | 382/104 |
| 7,720,580 B2* | 5/2010 | Higgins-Luthman | | B60R 1/23 |
| | | | | 701/28 |
| 7,855,755 B2* | 12/2010 | Weller | | G02F 1/133385 |
| | | | | 349/1 |
| 8,013,780 B2* | 9/2011 | Lynam | | G01S 17/86 |
| | | | | 342/55 |
| 8,694,224 B2* | 4/2014 | Chundrlik, Jr. | | H04N 7/183 |
| | | | | 701/41 |
| 9,090,234 B2* | 7/2015 | Johnson | | B60T 7/22 |
| 9,327,693 B2* | 5/2016 | Wolf | | B60W 10/04 |
| 9,487,235 B2* | 11/2016 | Bajpai | | B62D 6/00 |
| 9,509,957 B2* | 11/2016 | Higgins-Luthman | | |
| | | | | B60R 1/062 |
| 9,802,613 B2* | 10/2017 | Fuehrer | | B60W 30/18145 |
| 9,988,047 B2* | 6/2018 | Johnson | | B60W 30/16 |
| 10,233,679 B1* | 3/2019 | Chan | | B60Q 9/006 |
| 10,380,439 B2* | 8/2019 | Biemer | | G06V 10/25 |
| 10,486,708 B1* | 11/2019 | Chan | | G06V 40/20 |
| 11,142,200 B2* | 10/2021 | Laurent | | B60W 50/085 |
| 11,548,505 B2 | 1/2023 | Bharti | | |
| 2001/0005806 A1* | 6/2001 | Kim | | B60K 31/04 |
| | | | | 701/112 |
| 2003/0182046 A1* | 9/2003 | Nada | | B60W 10/10 |
| | | | | 180/170 |
| 2007/0057781 A1* | 3/2007 | Breed | | H01Q 1/3233 |
| | | | | 340/457.1 |
| 2009/0254260 A1* | 10/2009 | Nix | | G01S 15/10 |
| | | | | 348/148 |
| 2013/0261889 A1* | 10/2013 | Sekine | | B60W 50/085 |
| | | | | 701/93 |
| 2014/0005907 A1* | 1/2014 | Bajpai | | B60K 31/0008 |
| | | | | 701/96 |
| 2016/0347175 A1* | 12/2016 | Yamashita | | B60K 31/0008 |
| 2017/0274904 A1* | 9/2017 | Koide | | B60W 50/10 |
| 2017/0277192 A1* | 9/2017 | Gupta | | B60W 30/20 |
| 2018/0093677 A1* | 4/2018 | Yamashita | | B60W 30/165 |
| 2019/0143968 A1* | 5/2019 | Song | | B60W 10/18 |
| 2019/0311207 A1* | 10/2019 | Oniwa | | B60W 50/12 |
| 2020/0312155 A1* | 10/2020 | Kelkar | | B60W 60/005 |
| 2021/0094555 A1* | 4/2021 | Bajpai | | B60W 40/105 |
| 2021/0146962 A1* | 5/2021 | Kaji | | B60W 30/17 |
| 2021/0171031 A1* | 6/2021 | Bharti | | B60W 30/18072 |
| 2021/0188261 A1* | 6/2021 | Song | | B60W 40/105 |
| 2023/0147535 A1* | 5/2023 | Terazawa | | G01C 21/30 |

* cited by examiner

VEHICULAR DRIVER ASSIST SYSTEM WITH AUTOMATIC SPEED SETTING PARAMETERS

CROSS REFERENCE TO RELATED APPLICATIONS

The present application is a continuation of U.S. patent application Ser. No. 17/247,338, filed Dec. 8, 2020, now U.S. Pat. No. 11,548,505, which claims the filing benefits of U.S. provisional application Ser. No. 62/945,246, filed Dec. 9, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and provides a vehicle speed sensor disposed at a vehicle and a control including circuitry and associated software. The circuitry of the control includes a processor for processing sensor data sent by the vehicle speed sensor, and the control, responsive to processing by the processor at the control of sensor data sent by the vehicle speed sensor, determines a speed of the vehicle. The control, responsive to determining that the speed of the vehicle, reaches a vehicle soft lock speed of travel, enables a vehicle soft lock. The control, responsive to enabling the vehicle soft lock and the vehicle reducing speed to the vehicle soft lock speed by coasting, maintains the vehicle speed at the vehicle soft lock speed. The ECU, responsive to determining that the speed of the vehicle has increased a multiple of a vehicle speed increment above the vehicle soft lock speed, automatically sets an increased vehicle soft lock speed that is the multiple of the vehicle speed increment above the vehicle soft lock speed. The ECU, responsive to the vehicle reducing speed to the increased vehicle soft lock speed by coasting, maintains the vehicle speed at the increased vehicle soft lock speed.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to alter a speed control of a vehicle or assess conditions of the road along which the vehicle is traveling or assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
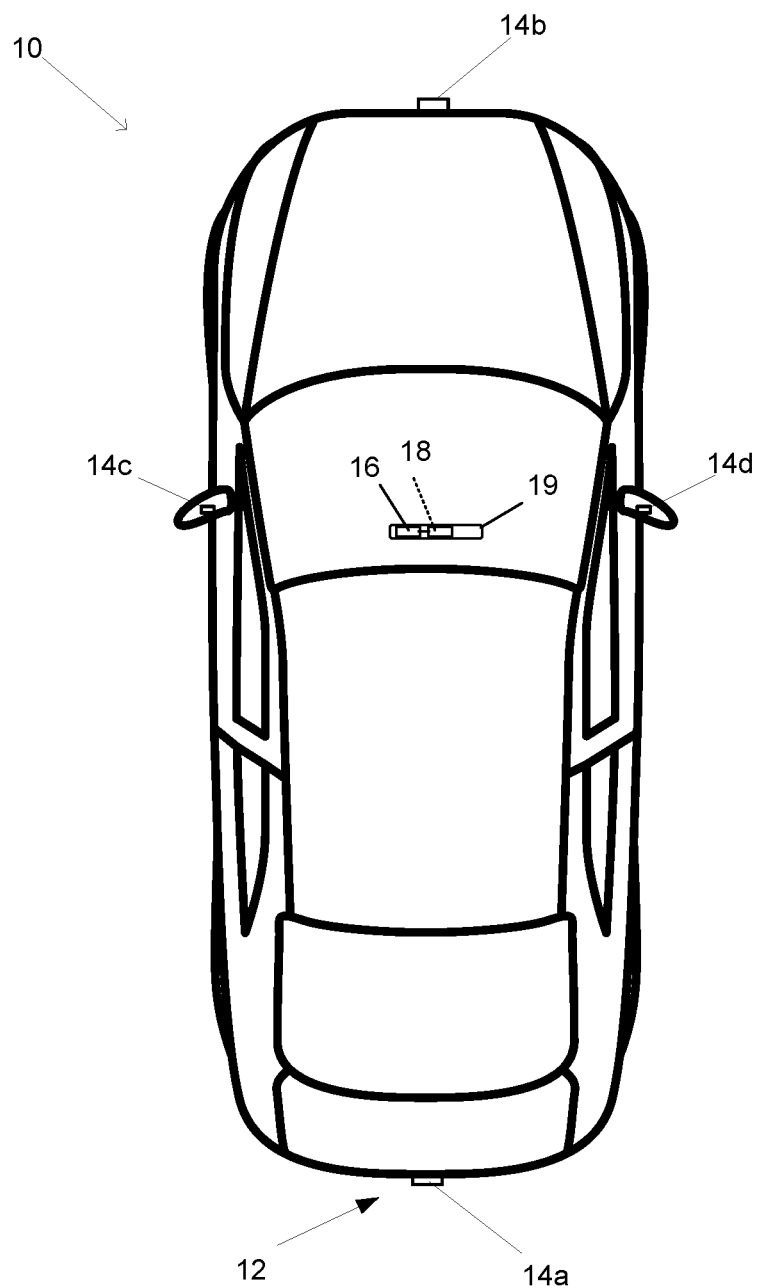
FIG. 1 is a plan view of a vehicle with a vision system that incorporates cameras in accordance with the present invention.

Referring now to the drawings and the illustrative embodiments depicted therein, a vehicle 10 includes an imaging system or vision system or driver assist system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having a data processor and associated circuitry and software, with the data processor being operable to process image data captured by the camera or cameras, whereby the ECU 18 may detect or determine presence of objects or the like and/or the system provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU 18 may comprise any suitable data or communication link, such as a vehicle network bus or the like of the equipped vehicle 10.

A vehicle's speed must be controlled in order to, for example, maintain safe driving practices of the vehicle or follow speed limit regulations as the vehicle travels along roadways. In some instances, such as on long drives, the driver maintains a vehicle's speed by keeping a constant pressure on the foot pedal, which may cause foot fatigue or, with regular use, possibly even injury. While a driver may have methods or tools for maintaining a constant speed of the vehicle other than keeping a constant pressure on the foot pedal with his foot (such as engaging a cruise control system), the driver may desire to maintain manual control of the vehicle's speed (i.e., not engage cruise control), for example, due to traffic, weather, or road conditions. Even when manually controlling the speed of the vehicle, however, the driver may still desire or need to take breaks from applying pressure to the foot pedal to rest their foot.

Figure 2:
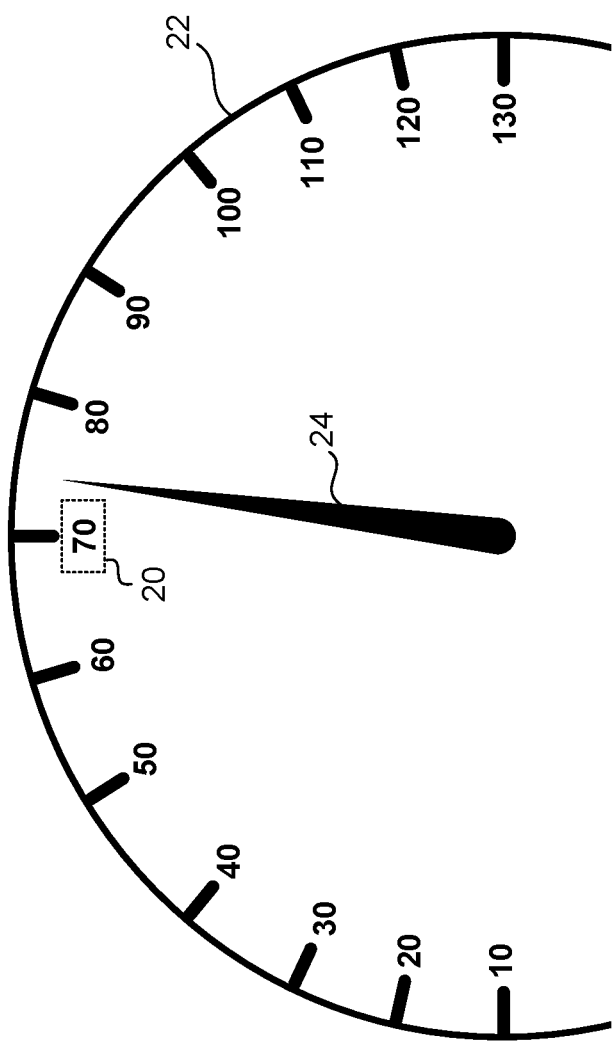
FIG. 2 is schematic view of a speedometer with a soft lock in accordance with the present invention.

Referring now to FIG. 2, the driver assist system 12 may implement a "soft lock" 20 at regular increments of the vehicle's speed. That is, whenever the speed reaches a multiplication of a speed increment (e.g., 1 mile per hour (mph), 5 mph or 10 mph), the system may enable a soft lock 20 at a vehicle soft lock speed (i.e., the multiplication of the speed increment). For example, if the given speed increment for a vehicle's driver assist system 12 is 10 mph, when the speed of the vehicle (e.g., due to the driver accelerating the vehicle) passes above 60 mph, indicated by the speedometer 22 and speedometer needle 24, the system may implement the soft lock 20 at 60 mph as 60 mph is a multiple of the speed increment. Similarly, when the speed of the vehicle passes or crosses above 70 mph, the soft lock 20 would change to 70 mph, as 70 mph is the next multiple of the speed implement (i.e., 10 mph in this example). Thus, the soft lock 20 may change incrementally, as designated by a multiple of a given speed increment, with the speed of the vehicle as the speed increases past each multiple of the given speed increment.

The system 12 may receive the vehicle speed from, for example, a vehicle speed sensor. For example, the system 12 may use sensor data from a wheel speed sensor, a GPS sensor, or any other sensor that accurately determines the vehicle speed.

Application of a soft lock allows the driver to remove their foot off of the accelerator pedal and the vehicle will coast (or move without further application of the vehicle's propulsion system or naturally decelerate) until the soft lock speed is reached, and then maintain speed at the soft lock. For example, if the driver accelerates the vehicle to 75 mph, and the soft lock engages every 10 mph, the soft lock will be established at 70 mph. If the driver removes their foot from the accelerator, the vehicle may coast down to 70 mph, and then maintain speed at 70 mph until either the accelerator or the brake is pressed.

In some examples, pressing the brake pedal removes all soft locks. That is, pressing the brake briefly and then releasing the brake would disengage any soft lock at all multiples of the given speed increment, allowing the vehicle to coast to a stop should the driver not apply any further pressure to the gas pedal. The soft lock may not re-engage until the driver again accelerates past a multiple of the increment. For example, when traveling at 70 mph and the driver brakes to 65 mph, all soft locks may be removed until the driver again accelerates past an increment of 10 mph (e.g., 70 mph). In some examples, the soft lock may re-engage after a period of time after the brake has been released.

In some examples, the soft lock will not engage until a threshold speed has been reached. For example, the soft lock may not engage unless the vehicle is going at a speed greater than 50 mph. The increment that the soft lock engages at may be any value. For example, the vehicle speed increment may be 20 mph, 10 mph, 5 mph, or 1 mph. The increment may be adjustable (e.g., by the driver) via, for example, programmable controls at a display of the vehicle. The speedometer 22 may visually indicate the soft lock 20. For example, the speed at which the soft lock 20 is engaged at (70 mph in FIG. 2) may be highlighted or include additional indicia.

The system may process image data from the camera 14a to recognize traffic signs, identify a current speed limit based on the traffic signs, and additionally indicate the current speed limit on the speedometer. The system may determine the current speed limit via other means, such as GPS as well. In some examples, the soft lock may automatically be set to the current speed limit when the vehicle is traveling at a speed greater than the speed limit (or some offset thereof). Optionally, the soft lock speed control system may not reset or operate responsive in part to a vehicular vision system or car2car communication system or the like, where the vehicular vision system or car2car communication system determines that one or more other vehicles are ahead of the equipped vehicle and applying a soft lock speed setting of the equipped vehicle is not appropriate or safe to do. For example, the vehicular vision system or car2car communication system may determine that one or more vehicles in the path of travel of the equipped vehicle are traveling at a speed less than or significantly less than a desired soft lock speed and determine that applying that soft lock speed setting would not be appropriate based on the difference or significant difference in the travel speed of the other vehicle(s) and the equipped vehicle.

The system may provide a notification when engaged and/or when disengaged. For example, the system may provide a visual (e.g., via a display disposed within the vehicle) or audible alert or haptic feedback (e.g., steering wheel vibrations) to the driver that the soft lock 20 has been engaged, adjusted, or disabled.

Thus, the driver assist system allows the driver to remove their foot from the accelerator pedal at any point for a rest or other reason without the need to engage any additional systems (e.g., a cruise control system). The system does not require any additional sensors to control (e.g., stop, slow down, and/or keep the vehicle in the current lane) the vehicle. The system does not require any manual input from the driver, which minimizes driver distraction. The system also requires fewer parameters than other typical driver assist systems (e.g., adaptive cruise control). The system reduces the amount of sensors and logic to reduce cost and offer a cheaper failsafe system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. No. 10,099,614 and/or U.S. Pat. No. 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252; 9,598,016; 9,264,672; and/or 6,642,851, and/or U.S. Publication Nos. US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver assist system, the vehicular driver assist system comprising:

a forward-viewing camera disposed at a windshield of a vehicle equipped with the vehicular driver assist system and viewing forward through the windshield of the vehicle;

an electronic control unit (ECU) comprising electronic circuitry and associated software;

wherein the electronic circuitry of the ECU comprises an image processor for processing image data captured by the forward-viewing camera;

wherein the vehicular driver assist system sets an initial vehicle soft lock speed when speed of the vehicle reaches an initial threshold speed of travel;

wherein, with the initial vehicle soft lock speed set and with the speed of travel of the vehicle exceeding the initial vehicle soft lock speed, the vehicular driver assist system maintains the vehicle speed at the initial vehicle soft lock speed when the vehicle speed reduces to the initial vehicle soft lock speed by coasting;

wherein the vehicular driver assist system sets an increased vehicle soft lock speed that is a multiple of a vehicle speed increment above the initial vehicle soft lock speed when the speed of the vehicle increases by the multiple of the vehicle speed increment above the initial vehicle soft lock speed; and wherein, with the increased vehicle soft lock speed set and with the speed of travel of the vehicle exceeding the increased vehicle soft lock speed, the vehicular driver assist system maintains the vehicle speed at the increased vehicle soft lock speed when the vehicle speed reduces to the increased vehicle soft lock speed by coasting.

2. The vehicular driver assist system of claim 1, wherein the vehicle speed increment is 5 miles per hour.

3. The vehicular driver assist system of claim 1, wherein the vehicle speed increment is 10 miles per hour.

4. The vehicular driver assist system of claim 1, wherein the vehicular driver assist system, responsive to receiving an indication that the brakes of the vehicle have been engaged, does not maintain the vehicle speed at the initial vehicle soft lock speed or the increased vehicle soft lock speed.

5. The vehicular driver assist system of claim 4, wherein, with the initial vehicle soft lock speed set, the initial vehicle soft lock speed is visually indicated to a driver of the equipped vehicle, and wherein, with the increased vehicle soft lock speed set, the increased vehicle soft lock speed is visually indicated to the driver of the equipped vehicle.

6. The vehicular driver assist system of claim 5, wherein the initial vehicle soft lock speed is visually indicated on a speedometer of the vehicle, and wherein the increased vehicle soft lock speed is visually indicated on the speedometer of the vehicle.

7. The vehicular driver assist system of claim 1, wherein the vehicle speed increment is adjustable by a driver of the vehicle.

8. The vehicular driver assist system of claim 1, wherein the initial threshold speed of travel at which the vehicular driver assist system sets the initial vehicle soft lock speed is based at least in part on a speed limit of a road the vehicle is traveling along.

9. The vehicular driver assist system of claim 8, wherein the vehicular driver assist system, responsive at least in part to processing at the ECU of image data captured by the forward-viewing camera, determines the speed limit of the road the vehicle is traveling along.

10. The vehicular driver assist system of claim 1, wherein a maximum speed setting for the increased vehicle soft lock speed is based on one selected from the group consisting of (i) a user preference and (ii) a manufacturer setting.

11. The vehicular driver assist system of claim 1, wherein a maximum speed setting for the increased vehicle soft lock speed is based on a speed limit of a road the vehicle is traveling along.

12. The vehicular driver assist system of claim 1, wherein image data captured by the forward-viewing camera is processed at the ECU for at least one selected from the group consisting of (i) traffic sign recognition, (ii) headlamp control, (iii) pedestrian detection, (iv) collision avoidance and (v) lane marker detection.

13. The vehicular driver assist system of claim 12, wherein image data captured by the forward-viewing camera is provided to the ECU via a data communication link.

14. The vehicular driver assist system of claim 1, wherein the vehicular driver assist system, responsive in part to determination of traffic ahead of the vehicle, does not maintain the vehicle speed at the initial vehicle soft lock speed or the increased vehicle soft lock speed.

15. A vehicular driver assist system, the vehicular driver assist system comprising:

a forward-viewing camera disposed at a windshield of a vehicle equipped with the vehicular driver assist system and viewing forward through the windshield of the vehicle;

an electronic control unit (ECU) comprising electronic circuitry and associated software;

wherein the electronic circuitry of the ECU comprises an image processor for processing image data captured by the forward-viewing camera;

wherein the vehicular driver assist system sets an initial vehicle soft lock speed when speed of the vehicle reaches an initial threshold speed of travel;

wherein the initial threshold speed of travel at which the vehicular driver assist system sets the initial vehicle soft lock speed is based at least in part on a speed limit of a road the vehicle is traveling along;

wherein, with the initial vehicle soft lock speed set and with the speed of travel of the vehicle exceeding the initial vehicle soft lock speed, the vehicular driver assist system maintains the vehicle speed at the initial vehicle soft lock speed when the vehicle speed reduces to the initial vehicle soft lock speed by coasting;

wherein the vehicular driver assist system sets an increased vehicle soft lock speed that is a multiple of a vehicle speed increment above the initial vehicle soft lock speed when the speed of the vehicle increases by the multiple of the vehicle speed increment above the initial vehicle soft lock speed;

wherein, with the increased vehicle soft lock speed set and with the speed of travel of the vehicle exceeding the increased vehicle soft lock speed, the vehicular driver assist system maintains the vehicle speed at the increased vehicle soft lock speed when the vehicle speed reduces to the increased vehicle soft lock speed by coasting; and wherein a maximum speed setting for the increased vehicle soft lock speed is based on the speed limit of the road the vehicle is traveling along.

16. The vehicular driver assist system of claim 15, wherein the vehicle speed increment is 5 miles per hour.

17. The vehicular driver assist system of claim 15, wherein the vehicle speed increment is 10 miles per hour.

18. The vehicular driver assist system of claim 15, wherein the vehicular driver assist system, responsive to receiving an indication that the brakes of the vehicle have been engaged, does not maintain the vehicle speed at the initial vehicle soft lock speed or the increased vehicle soft lock speed.

19. The vehicular driver assist system of claim 15, wherein, with the initial vehicle soft lock speed set, the initial vehicle soft lock speed is visually indicated to a driver of the equipped vehicle, and wherein, with the increased vehicle soft lock speed set, the increased vehicle soft lock speed is visually indicated to a driver of the equipped vehicle.

20. The vehicular driver assist system of claim 19, wherein the initial vehicle soft lock speed is visually indicated on a speedometer of the vehicle, and wherein the increased vehicle soft lock speed is visually indicated on the speedometer of the vehicle.

21. The vehicular driver assist system of claim 15, wherein the vehicle speed increment is adjustable by a driver of the vehicle.

22. The vehicular driver assist system of claim 15, wherein the vehicular driver assist system, responsive at least in part to processing at the ECU of image data captured by the forward-viewing camera, determines the speed limit of the road the vehicle is traveling along.

23. The vehicular driver assist system of claim 15, wherein image data captured by the forward-viewing camera is processed at the ECU for at least one selected from the group consisting of (i) traffic sign recognition, (ii) headlamp control, (iii) pedestrian detection, (iv) collision avoidance and (v) lane marker detection.

24. The vehicular driver assist system of claim 23, wherein image data captured by the forward-viewing camera is provided to the ECU via a data communication link.

25. The vehicular driver assist system of claim 15, wherein the vehicular driver assist system, responsive in part to determination of traffic ahead of the vehicle, does not maintain the vehicle speed at the initial vehicle soft lock speed or the increased vehicle soft lock speed.

26. A vehicular driver assist system, the vehicular driver assist system comprising:

a forward-viewing camera disposed at a windshield of a vehicle equipped with the vehicular driver assist system and viewing forward through the windshield of the vehicle;

an electronic control unit (ECU) comprising electronic circuitry and associated software;

wherein the electronic circuitry of the ECU comprises an image processor for processing image data captured by the forward-viewing camera;

wherein image data captured by the forward-viewing camera is processed at the ECU for lane marker detection and at least one selected from the group consisting of (i) traffic sign recognition, (ii) pedestrian detection and (iii) collision avoidance;

wherein the vehicular driver assist system sets an initial vehicle soft lock speed when speed of the vehicle reaches an initial threshold speed of travel;

wherein, with the initial vehicle soft lock speed set and with the speed of travel of the vehicle exceeding the initial vehicle soft lock speed, the vehicular driver assist system maintains the vehicle speed at the initial vehicle soft lock speed when the vehicle speed reduces to the initial vehicle soft lock speed by coasting;

wherein the vehicular driver assist system sets an increased vehicle soft lock speed that is a multiple of a vehicle speed increment above the initial vehicle soft lock speed when the speed of the vehicle increases by the multiple of the vehicle speed increment above the initial vehicle soft lock speed; and wherein, with the increased vehicle soft lock speed set and with the speed of travel of the vehicle exceeding the increased vehicle soft lock speed, the vehicular driver assist system maintains the vehicle speed at the increased vehicle soft lock speed when the vehicle speed reduces to the increased vehicle soft lock speed by coasting.

27. The vehicular driver assist system of claim 26, wherein the vehicle speed increment is 5 miles per hour.

28. The vehicular driver assist system of claim 26, wherein the vehicle speed increment is 10 miles per hour.

29. The vehicular driver assist system of claim 26, wherein, with the initial vehicle soft lock speed set, the initial vehicle soft lock speed is visually indicated to a driver of the equipped vehicle, and wherein, with the increased vehicle soft lock speed set, the increased vehicle soft lock speed is visually indicated to the driver of the equipped vehicle.

30. The vehicular driver assist system of claim 29, wherein the initial vehicle soft lock speed is visually indicated on a speedometer of the vehicle, and wherein the increased vehicle soft lock speed is visually indicated on the speedometer of the vehicle.

31. The vehicular driver assist system of claim 26, wherein the vehicle speed increment is adjustable by a driver of the vehicle.

32. The vehicular driver assist system of claim 26, wherein the initial threshold speed of travel at which the vehicular driver assist system sets the initial vehicle soft lock speed is based at least in part on a speed limit of a road the vehicle is traveling along.

33. The vehicular driver assist system of claim 26, wherein a maximum speed setting for the increased vehicle soft lock speed is based on one selected from the group consisting of (i) a user preference, (ii) a manufacturer setting and (iii) a speed limit of a road the vehicle is traveling along.

34. The vehicular driver assist system of claim 26, wherein image data captured by the forward-viewing camera is provided to the ECU via a data communication link.

35. The vehicular driver assist system of claim 26, wherein the vehicular driver assist system, responsive in part to determination of traffic ahead of the vehicle, does not maintain the vehicle speed at the initial vehicle soft lock speed or the increased vehicle soft lock speed.

\* \* \* \* \*